United States Patent
Radke (12)

(10) Patent No.: US 6,250,722 B1
(45) Date of Patent: Jun. 26, 2001

(54) TWO-PIECE HUB EXTENSION

(75) Inventor: Gregory Dean Radke, Waterloo, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/437,190

(22) Filed: Nov. 9, 1999

(51) Int. Cl.$^7$ ..................................................... B60B 11/00
(52) U.S. Cl. ....................... 301/36.1; 301/35.62; 301/111
(58) Field of Search ................................. 301/13.2, 36.2, 301/105.1, 111, 35.62

(56) References Cited

U.S. PATENT DOCUMENTS

| | | | |
|---|---|---|---|
| 2,635,012 | * | 4/1953 | Rappaport ............................ 301/36.1 |
| 4,214,792 | | 7/1980 | Hardwicke et al. . |
| 4,333,688 | | 6/1982 | Lemmon et al. . |
| 5,100,205 | * | 3/1992 | Hardwicke ........................... 301/36.1 |

FOREIGN PATENT DOCUMENTS

3145101 * 6/1988 (JP) ................................... 301/105.1

OTHER PUBLICATIONS

Case—IH Hub Extension (MX240 & MX 270) (No Date).

* cited by examiner

Primary Examiner—Russell D. Stormer

(57) ABSTRACT

A two-piece hub extension for adding dual wheels to a mechanical front-wheel drive axle of an agricultural tractor has an inner extension ring that surrounds the final drive cover of the front axle and an outer extension member of reduced diameter that extends outward from the inner extension ring. The inner extension ring only extends outward far enough to clear the axle final drive cover. The inner ring is mounted by bolts that extend entirely through ring so that the bolt heads are external of the inner ring and can be easily reached. The outer extension member is mounted to the inner extension ring by long bolts extending through the inner extension ring and into the hub. The dual wheel is mounted to the outer wheel hub. The reduced diameter of the outer extension member results in improved crop clearance between the two tires.

17 Claims, 4 Drawing Sheets

TWO-PIECE HUB EXTENSION

BACKGROUND OF THE INVENTION

1. Field of the Invention

The present invention relates to a hub extension for attaching a dual wheels to a tractor front axle with mechanical front-wheel drive and in particular to a twopiece hub extension.

2. Description of the Related Art

Non-articulated, four-wheel drive agricultural tractors with a mechanical front-wheel drive (MFWD), where a steering axle is provided with drive capability, have become common place. Recently, dual front wheels have been added to the front axle the by attaching a hub extension to each axle hub and mounting a second wheel on each side of the tractor. The advantages of dual front wheels are improved traction and reduced soil compaction by decreasing the weight carried by each tire. A typical hub extension is a single piece structure or weldment that is generally barrel shaped, having a sleeve like body portion with an in-turned radial flanges at each end. One flange is bolted to the inner wheel and the axle hub so that the extension projects horizontally outward. The dual wheel is bolted to the outer flange of the hub extension. Since the radial flanges of the extension are in-turned, it is necessary to provide access openings in the extension body to reach bolts and nuts inside the extension. Installation and removal of the dual wheels and re-torquing of the bolts are difficult and cumbersome due to poor access to the nuts and bolts.

SUMMARY OF THE INVENTION

The hub extension of the present invention is of a two-piece construction having an inner extension ring that surrounds the final drive cover of the front axle and an outer extension member. The inner extension ring has inner and outer flanges like the above mentioned single piece hub extensions but only extends outward enough to clear the final drive cover of the axle. The inner ring is mounted by bolts that extend through both the outer and inner flanges and into the axle hub. As a result, the bolt heads are external of the inner ring and can be easily reached. The inner extension ring has cutout portions to provide clearance for a pair of diametrically spaced wheel mounting bolts that are used to first attach a wheel disc to the axle hub. This enables the inner wheel to be mounted to the axle hub first, before the extension is mounted.

The outer extension member has an axially inner mounting flange and an axially outer wheel flange. These flanges both project radially outward from the tubular body of the outer extension member. The mounting flange is scalloped to provide clearance for the bolts that mount the inner extension ring to the axle hub. Long bolts extend through the mounting flange of the outer extension member, through the inner extension ring and into the hub to attach the outer extension member to the axle hub. The dual wheel is mounted to the outer wheel hub.

It is an advantage of the two piece construction that all bolts are accessible without reaching into the interior of any of the extension components. Furthermore, the smaller diameter body of the outer extension member provides a greater clearance for crops between the inner and outer tires. In addition, the overall diameter of both the inner extension ring and the outer extension member is small enough to allow full use of multi-position wheels on the front drive axle.

DESCRIPTION OF THE PREFERRED EMBODIMENT

Figure 1:
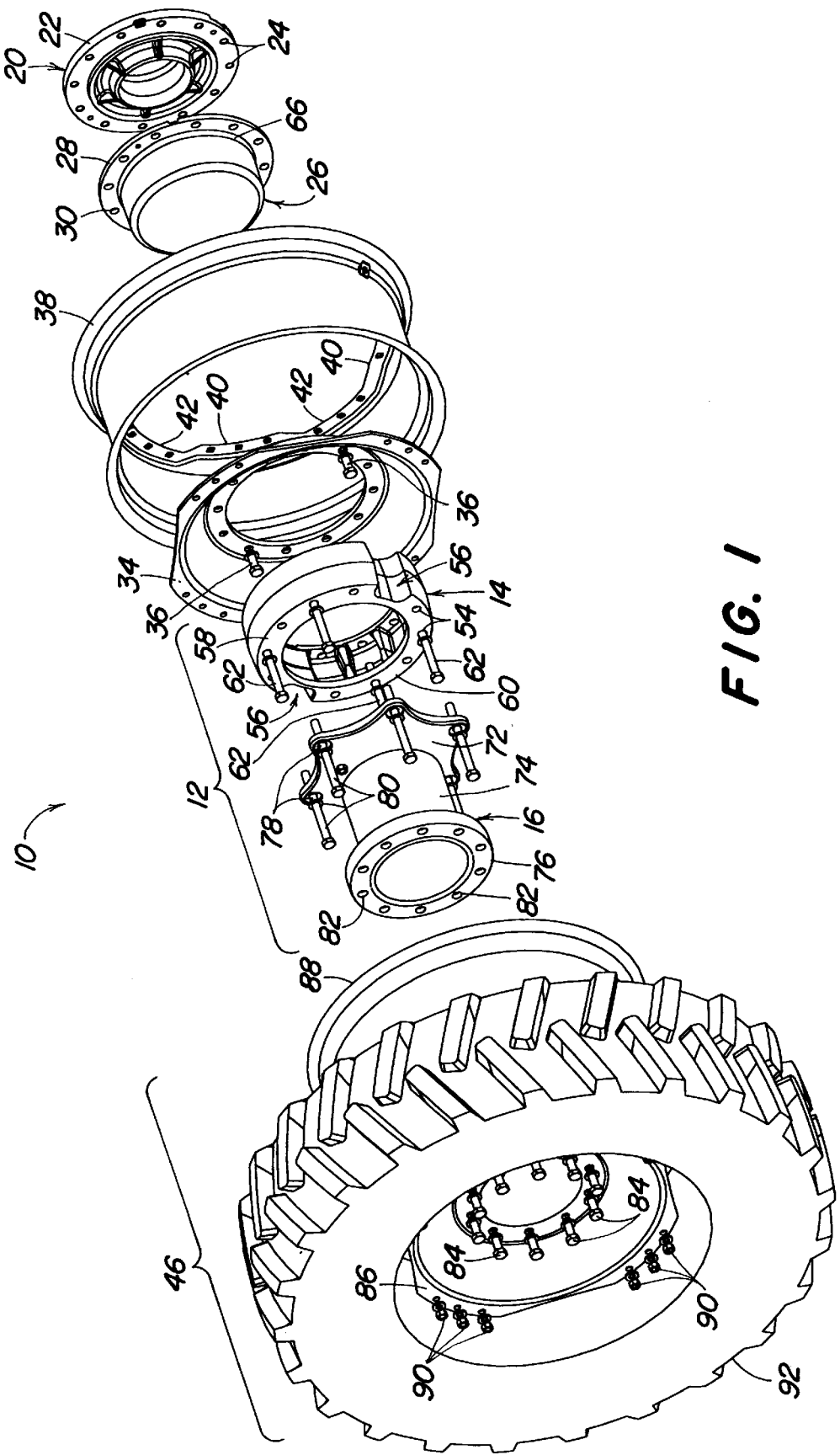
FIG. 1 is an exploded perspective view of a dual front wheel assembly containing the two hub extension of the present invention.

With reference to FIG. 1 a dual front wheel assembly having the hub extension of the present invention as shown in FIG. 1 and designated generally at 10. The dual front wheel assembly 10 includes the hub extension assembly 12 of the present invention which comprises an inner extension ring 14 and an outer extension member 16, described more fully below.

The dual wheel assembly is mounted to an axle hub 20 that is part of the mechanical front-wheel drive axle of an agricultural tractor. The hub 20 includes a radial wheel flange 22 that has a circular pattern of threaded bolt apertures 24. The tractor axle includes a planetary final drive (not shown) in a known manner. A final drive cover 26 conceals the final drive. The cover 26 extends axially outward beyond the wheel flange 22. A radial flange 28 extends outward from the cover 26 and has apertures 30 aligned with the apertures 24 in the wheel flange. The wheel flange 22 extends radially outward beyond the final drive cover 26. The final drive cover is coupled to the hub 20 by fasteners, not shown, in a known manner.

Figure 5:
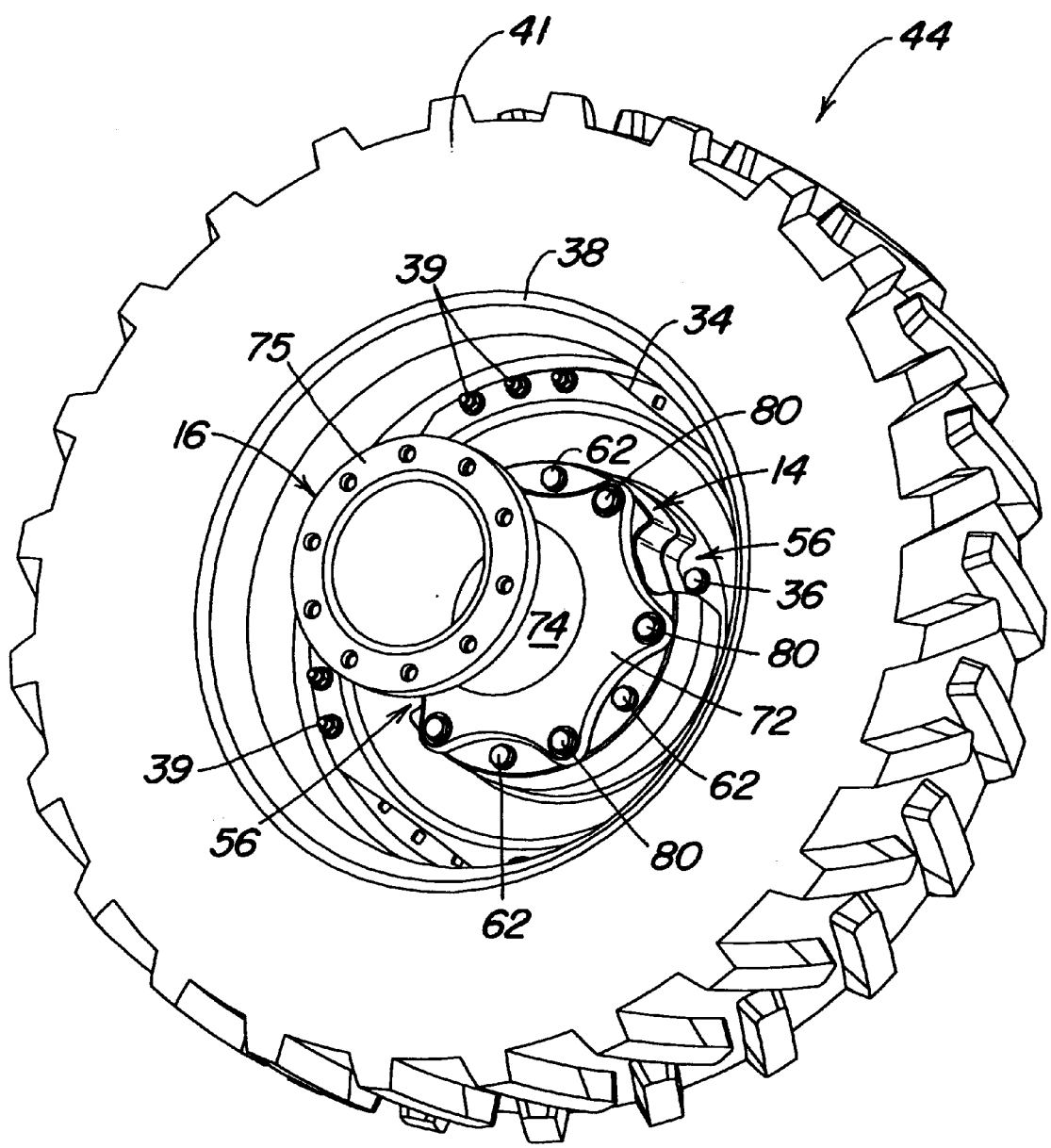
FIG. 5 is a perspective view of a portion of the dual front wheel assembly shown in FIG. 1.

A pair of diametrically spaced wheel bolts 36 secures an inner wheel disc 34 to the wheel flange 22. The bolts 36 are threaded into two of the bolt apertures 24 to secure the wheel disc 34 thereto. A wheel rim 38 is bolted to the periphery of the wheel disc 34 by bolts 39 (FIG. 5) using one of the two sets of apertures 40 and 42 on the rim 38. The wheel disc 34, rim 38 and tire 41 (FIG. 5) comprise a drive wheel assembly 44. The drive wheel assembly 44 is a multi-position assembly that enables the tread width of the front tires to be varied by changing the orientation of the rim 38 relative to the disc 34 and/or changing the orientation of the wheel disc 34 relative to the hub 20. A wide variety of tread width combinations can be produced.

Figure 2:
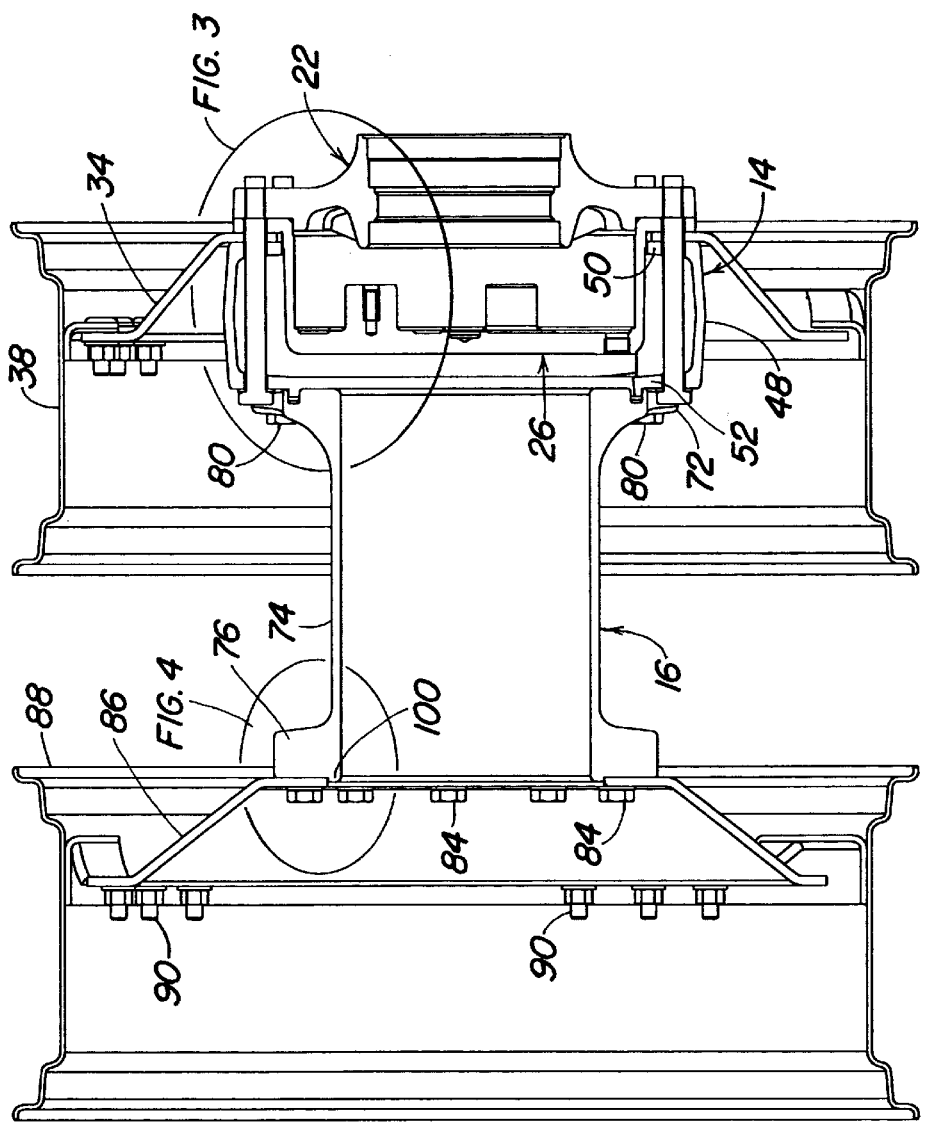
FIG. 2 a sectional view of the dual front wheel assembly shown in FIG. 1.
Figure 3:
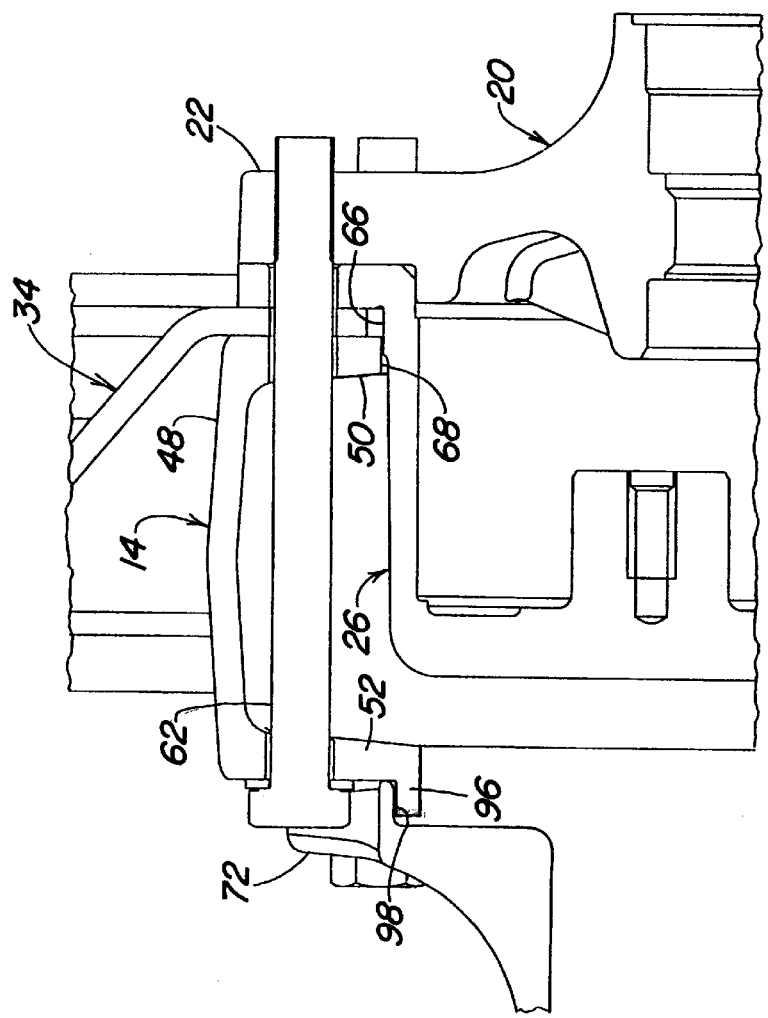
FIG. 3 is an enlarged sectional view of the area contained in circle 3 in FIG. 2.

The hub extension assembly 12 of the present invention is mounted to the hub 20, outboard of the wheel disc 34, to enable an outer, or dual, wheel and tire assembly 46 to be mounted to the axle and spaced outward of the inner wheel and tire assembly 44 to provide clearance for a crop row between the two tires. After the wheel disc 34 is mounted to the hub 20, the inner extension ring 14 of the hub extension assembly is mounted to the hub 20. The inner extension ring 14 is generally barrel shaped, having an axial sleeve 48 forming a main body and having an inner radial flange 50 and an outer radial flange 52 as seen in FIGS. 2 and 3. The inner and outer flanges 50, 52 extend radially inward from the sleeve 48. The inner and outer flanges are provided with bores 54 (FIG. 1) arranged in the same circular pattern as the apertures 24 of the wheel flange 22.

The inner extension ring 14 is provided with cut out portions 56 (FIGS. 1 and 5) to provide clearance for the wheel bolts 36 that attach the wheel disc 34 to the hub 20. Accordingly, the inner and outer flanges are divided into two arcuate segments 58, 60 each having five bores 54. Four ring-mounting bolts 62 initially mount the inner extension ring 14 with two bolts in each of the two arcuate segments 58, 60. The bolts are placed in the second and fourth bores in each segment. The ring mounting bolts 62 pass through both the inner and outer flanges of the inner extension ring, through the apertures in the wheel disc 34 and into the threaded apertures 24 in the wheel flange of the hub 20. The ring mounting bolts thus also secure the wheel disc to the hub.

To properly position the inner extension ring on the hub, the final drive cover 26 is provided with a machined pilot surface 66. A radially inner edge surface 68 of the inner flange 50 pilots on the surface 66 of the final drive cover. This properly centers the inner extension ring 14 on the final drive cover and hub 20.

The outer extension member 16 has an axially extending sleeve 74 and axially spaces apart inner mounting flange 72 and outer wheel flange 76 at the ends of the axial sleeve 74. The mounting flange 72 has a plurality of bolt apertures 78 arranged in a circular pattern having the same diameter as, and aligned with the apertures 24 in the wheel flange 22. The mounting flange 72 is scalloped to provide clearance for the ring mounting bolts 62. The mounting flange 72 only has half the number of apertures 78 as there are apertures 24 in the wheel flange 22. The mounting flange 72 abuts the outer flange 52 of the inner extension ring (FIGS. 2 and 3). Long bolts 80 extend through the mounting flange 72, through both flanges of the inner extension ring, through the wheel disc 34 and into the threaded apertures 24 in the wheel flange 22 to mount the outer extension member to the hub. The long bolts 80 are placed in the first, third and fifth bores in each of the arcuate segments 58, 60 of the inner extension ring.

The outer flange 52 of the inner extension ring is provided with an axially outwardly projecting lip 96 at the radial inner edge of the outer flange 52. The lip 96 seats within an axially inwardly projecting lip 98 in the mounting flange 72 of the outer extension member 16. The two lips form pilot surfaces to center the outer extension member 16 relative to the inner extension ring 14.

The outer wheel flange 76 is provided with a circular pattern of threaded bolt apertures 82. These apertures receive wheel bolts 84 to mount an outer wheel disc 86 to the outer extension member 16. An outer wheel rim 88 is mounted to the disc 86 by bolts 90 and carries a tire 92, forming the outer wheel and tire assembly 46. In the embodiment shown, the outer wheel flange 76 has a smaller diameter bolt circle than the hub 20. It will be readily appreciated that the diameter of the bolt pattern of the outer wheel hub could be the same as that of the pattern of the bolt apertures 24 if desired.

Figure 4:
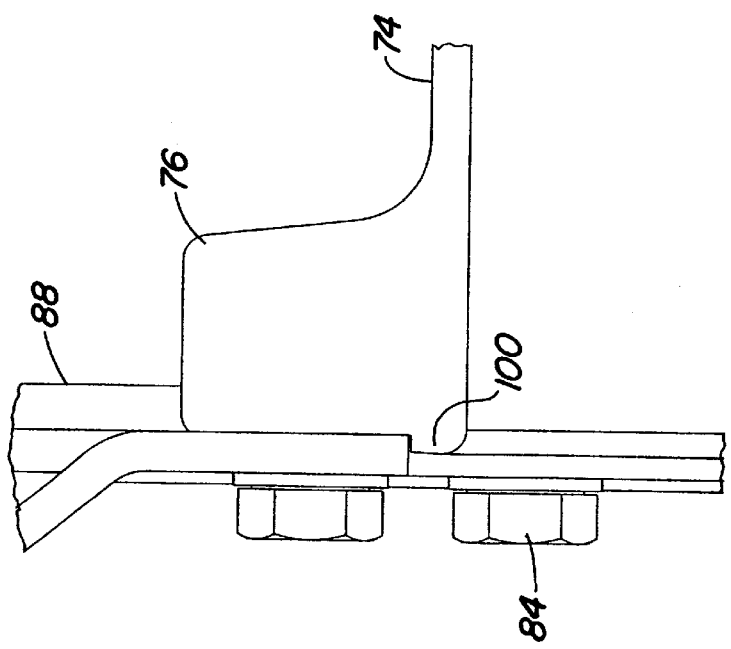
FIG. 4 is an enlarged sectional view of the area contained in circle 4 in FIG. 2.

The outer wheel flange 76 is formed with an axially projecting lip 100 (FIGS. 2 and 4) at the radial inner edge of the flange 76. This forms a pilot surface for the outer wheel disc 86 to insure proper positioning of the outer wheel and tire assembly 46. The pilot surfaces cooperate to ensure the proper positioning of the inner and dual tires on the centerline of the axle hubs.

The larger diameter of the inner extension ring 14 provides clearance around the final drive cover 26. The outer flange 52 is located axially just beyond the cover 26 so that the larger diameter ring 14 is not any longer axially than necessary. The smaller diameter of the axial sleeve 74 of the outer extension member provides greater crop clearance between the two tires. The inner extension ring and outer extension member are configured so that they do not interfere with the wheel discs 34 and 86, enabling the discs to be used in any orientation to preserve the multipleposition feature of the wheel discs. All of the bolts can be accessed without reaching inside any of the components, providing easier mounting and removal of the dual wheel and tire assembly and re-torquing of the bolts. Removal of the outer extension member can be accomplished by removing fewer bolts as compared to prior designs and removal of the outer extension member does not disturb the mounting of the inner wheel and tire assembly 44.

The invention should not be limited to the above-described embodiment, but should be limited solely by the claims that follow.

What is claimed is:

1. A hub extension assembly for a tractor front axle with mechanical frontwheel drive, the axle having a final drive with a hub and a final drive cover, the hub having a radial wheel flange extending radially beyond the final drive cover and having a circular pattern of bolt apertures therethrough, the drive cover extending axially beyond the wheel flange, the axle further having a wheel disc attached thereto by a pair of diametrically spaced wheel bolts passing through the wheel disc and into the wheel flange, the extension comprising:

an inner extension ring surrounding the final drive cover and having axially spaced inner and outer flanges with through bores aligned with the bolt apertures in the wheel flange and a cut out to provide clearance for the wheel bolts, the inner flange abutting the wheel disc and the inner extension ring being secured to the wheel flange by bolts passing through a portion of the bores in the inner and outer flanges and the bolt apertures in the wheel flange whereby the bolts further secure the wheel disc to the wheel flange; and an outer extension member having an inner mounting flange with bolt apertures aligned with the remaining apertures in the wheel hub, the mounting flange abutting the outer flange of the inner extension ring and being scalloped to provide clearance for the bolts attaching the inner extension ring to the hub, the outer extension member further having an outer wheel flange with a circular pattern of bolt apertures therethrough for mounting of an outer wheel disc thereto.

2. The hub extension assembly as defined by claim 1 wherein the outer extension member has an axially extending sleeve between the mounting flange and the wheel flange that has a diameter less than a diameter of the final drive cover.

3. The hub extension assembly as defined by claim 1 wherein the outer extension member has an axially extending sleeve between the mounting flange and the wheel flange and wherein the mounting flange and the wheel flange both project radially outward of the sleeve.

4. The hub extension assembly as defined by claim 1 wherein the inner extension ring has an axial sleeve between the inner and outer flanges and the sleeve is radially outward of the flanges and wherein the outer extension member has a sleeve between the mounting and wheel flanges and the sleeve is radially inward of the flanges.

5. The hub extension assembly as defined by claim 1 wherein the inner extension member has a surface that pilots on the final drive cover to center the inner extension member on the hub.

6. The hub extension assembly as defined by claim 1 wherein the inner extension ring has an axially outwardly projecting annular lip on the outer flange forming a pilot surface to center the outer extension member on the hub.

7. The hub extension assembly as defined by claim 6 wherein the outer extension member has an axially inwardly projecting lip to form a pilot diameter on the mounting flange that receives the axially projecting annular lip of the inner extension ring.

8. The hub extension assembly as defined by claim 1 wherein the outer extension member has a pilot surface to center the dual wheel disc thereon.

9. The hub extension assembly as defined by claim 1 wherein the outer flange of the inner extension member is axially outboard of the final drive cover.

10. The hub extension assembly as defined by claim 1 wherein the circular bolt pattern on the outer extension member wheel flange has a smaller diameter than the circular bolt pattern on the hub wheel flange.

11. A hub extension assembly for a tractor front axle with mechanical front-wheel drive, the axle having a final drive with a hub and a final drive cover, the hub having a radial wheel flange extending radially beyond the final drive cover and having a circular pattern of bolt apertures therethrough, the drive cover extending axially beyond the wheel flange, the axle further having a wheel disc attached thereto by a pair of diametrically spaced wheel bolts passing through the wheel disc and into the wheel flange, the extension comprising:

an inner extension ring with axially spaced inner and outer flanges and a first axial sleeve therebetween, the inner and outer flanges extending radially inward from the first sleeve;

an outer extension member with axially spaced mounting and wheel flanges and a second axial sleeve therebetween, the mounting and wheel flanges extending radially outward of the second axial sleeve; and the inner and outer flanges of the inner extension ring and the mounting flange of the outer extension member having a plurality of through bores aligned with bolt apertures of the wheel hub.

12. The hub extension assembly as defined by claim 11 wherein the diameter of the second axial sleeve is less than the diameter of the final drive cover.

13. The hub extension assembly as defined by claim 11 wherein the inner extension ring is attached to the hub by bolts passing through both the inner and outer flanges of the inner extension ring.

14. The hub extension assembly as defined by claim 11 wherein the outer extension member is attached to the hub by bolts passing through inner extension ring and into the hub.

15. The hub extension assembly as defined by claim 11 wherein the inner and outer flanges of the inner extension ring have cut out portions for clearance for the wheel bolts mounting the wheel disc to the hub.

16. The hub extension assembly as defined by claim 11 wherein the inner extension ring and the outer extension member having cooperating pilot surfaces to ensure the centering of the outer extension member on the inner extension ring.

17. The hub extension assembly as defined by claim 11 wherein the outer extension member has a pilot surface to center an outer wheel disc on the wheel flange of the outer extension member.

* * * * *